United States Patent [19]

Willis

[11] Patent Number: 5,040,003

[45] Date of Patent: Aug. 13, 1991

[54] METHOD AND APPARATUS FOR RECORDING COLOR WITH PLURAL PRINTHEADS

[75] Inventor: Roger L. Willis, Churchville, N.Y.

[73] Assignee: Eastman Kodak Company, Rochester, N.Y.

[21] Appl. No.: 533,229

[22] Filed: Jun. 4, 1990

[51] Int. Cl.$^5$ ............................................. G03G 15/01
[52] U.S. Cl. .................................... 346/157; 355/326
[58] Field of Search ........................ 346/157; 358/326; 355/326–328

[56] References Cited

U.S. PATENT DOCUMENTS

| | | | |
|---|---|---|---|
| 4,731,622 | 3/1988 | Hicks et al. | 346/157 |
| 4,816,844 | 3/1989 | Uchida et al. | 346/157 X |
| 4,903,048 | 2/1990 | Harrington . | |
| 4,903,067 | 2/1990 | Murayama et al. | 346/157 X |
| 4,905,091 | 2/1990 | Suzuki et al. . | |
| 4,912,491 | 3/1990 | Hoshino et al. | 346/157 X |

FOREIGN PATENT DOCUMENTS

WO90/01730 2/1990 World Int. Prop. O. .

*Primary Examiner*—George H. Miller, Jr.
*Attorney, Agent, or Firm*—Norman Rushefsky

[57] ABSTRACT

In an electrophotographic printer first and second printheads are provided for recording, in accordance with electronic data the same image frame. To reduce the cost for mechanical supports needed to accurately register pixels recorded by the respective printheads, a test is run to determine the misregistration between the printheads and the data to be printed. In response to these tests, the timing and/or cross-track position of the printing of the pixels on the recording member is adjusted to register the pixels printed by one printhead with those printed by the other.

19 Claims, 5 Drawing Sheets

METHOD AND APPARATUS FOR RECORDING COLOR WITH PLURAL PRINTHEADS

BACKGROUND OF THE INVENTION

1. Field of the Invention

This invention relates to color printing such as used in electrophotography and more specifically to a method and apparatus of forming a multicolor image on the same frame or area of a recording member, so that it may be transferred or otherwise utilized in a single step.

2. Description of the Prior Art

In the prior art as represented by International Publication Number WO 90/01 730, images can be formed consecutively on the same image frame of a photoconductor without fixing the first image by the use of successive steps of charging, exposing and developing and then repeating such steps for each color to be created upon that image frame. The resulting multicolor image is transferred to a receiving sheet in one step thereby increasing the productivity of the printer or copier.

The exposure steps as taught in this publication are carried out using separate LED (light-emitting diode) printheads for each color to be formed. Typically, these printheads have a single row of several thousand LED's arranged at say 300 dots per inch across the photoconductor and are controllably illuminated to modulate an electrostatic charge on the photoconductor to form images on a dot-by-dot or pixel-by-pixel basis.

A problem with the use of plural LED printheads is the alignment of both, relative to each other so that image recorded colored pixels are appropriately formed in a desired pattern, i.e., that they are registered. In view of the small spacing between LED's on a printhead, incorrect location of the printhead will cause images to be misregistered thereby affecting color and quality of the resulting image. To this end, expensive mechanical means may be devised to ensure that one printhead is accurately located relative to another but this raises considerable costs to the manufacture of a printer apparatus.

It is therefore an object of the invention to provide improved means for ensuring registration of the printheads used in a color printer apparatus having two or more printheads.

It is a further objection of the invention to provide improved means for registering images vis-a-vis the printing of same on a copy sheet.

SUMMARY OF THE INVENTION

These and other objects which will become apparent from reading the specifications are accomplished by a method and apparatus for improving the registration of pixels recorded by one or more printhads using adjustment to the timing or cross-track location of recording of data signals relative to another printhead or a transfer operation.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENTS

The apparatus of the preferred embodiments will be described in accordance with an electrophotographic recording medium. The invention, however, is not limited to apparatus for creating images on such a medium, as other media such as photographic film etc. may also be used with the invention.

Beause electrophotographic reproduction apparatus are well known, the present description will be directed in particular to elements forming part of or cooperating more directly with the present invention. Apparatus not specifically shown or described herein are selectable from those known in the prior art.

The invention can be used in a variety of electrophotographic applications. It will be described with regard to the electronic printer of FIG. 1.

Figure 1:
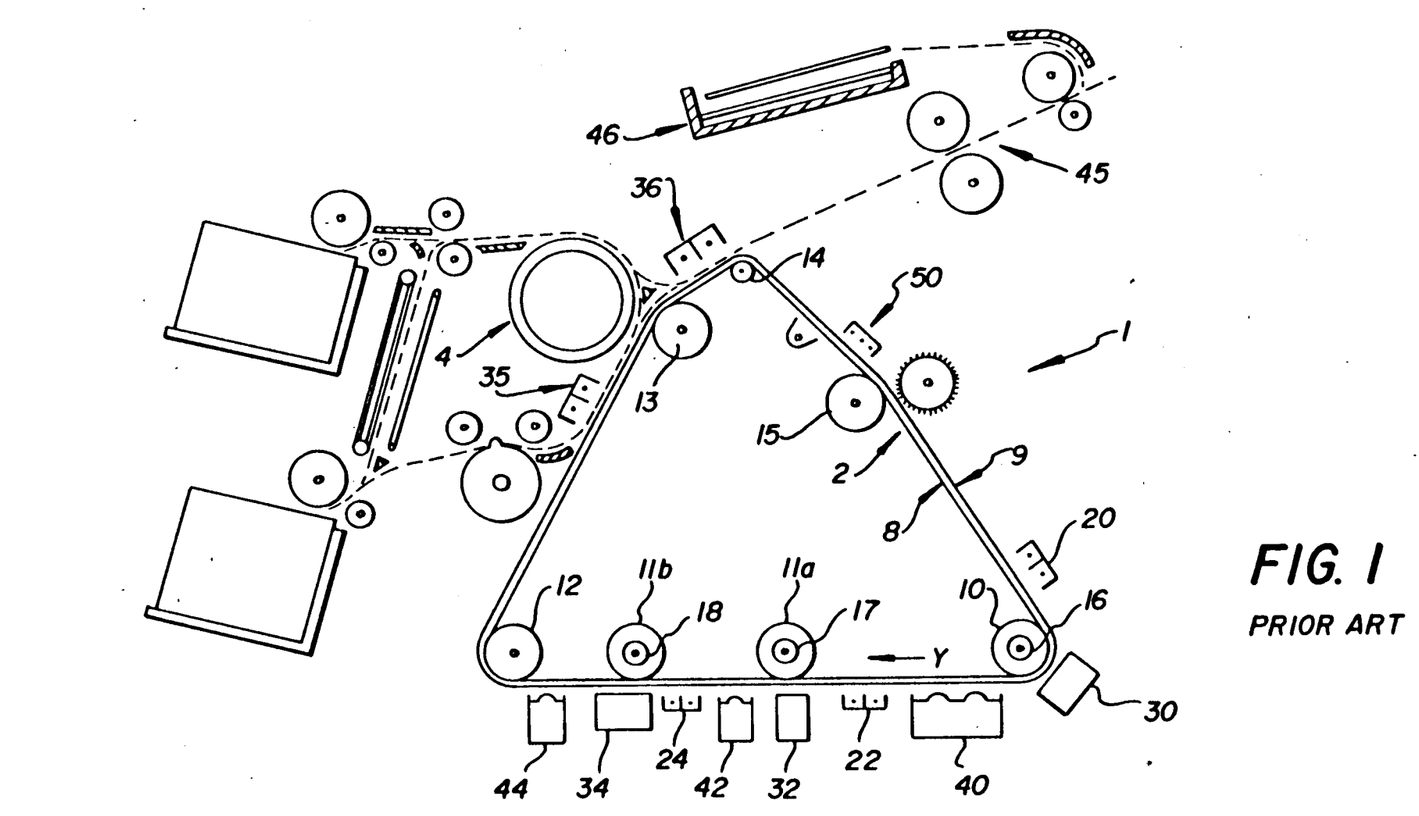
FIG. 1 is a schematic side illustration of a electrophotographic printer of the prior art and illustrating one embodiment of printer apparatus that the invention may be incorporated.

According to FIG. 1 an electronic printer 1 includes a photoconductive member, for example, photoconductive web 2 entrained about a series of rollers 10, 11a, 11b, 12, 13, 14 and 15. The photoconductive web 2 is a multilayer structure which can take various forms, but is commonly a photoconductive layer 9 on a conductive backing 8 with a suitable support. The web 2 is driven by one of the rollers at a constant velocity through operative relationship with a series of electrophotographic stations.

A first charging station 20 imparts a uniform charge to an image area of the photoconductive surface on the web 2 which charge may be of either polarity depending on the characteristics of the photoconductive web. The uniformly charged image area is then exposed at a first electronic exposure station 30 to dissipate the charge creating a first electrostatic image. The electronic exposure station 30 can be any known device which converts electrical signals into a light image, for example, a scanning laser or an LED printhead. The first electrostatic image is toned at a first development station 40 by the application of finely-divided marking particles which are charged to the same polarity as the original charge placed on the web by first charging station 20 to thereby tone the areas of the web that are discharged by exposure at the first electronic exposing station 30 to create a first toner image of a first color, for example, black.

The same image area of the web then passes into operative relation with a second charging station 22 which essentially repeats the process of the first charging station, uniformly charging the web to a polarity the same as the polarity imparted by first charging station 20. The uniformly charged photoconductive member 2 is now imagewise exposed at second electronic exposure station 32 to create a second electrostatic image by imagewise discharging the photoconductor. The second electrostatic image is then toned at second development station 42 by the application again of finely-divided toner of a second color having a charge the same as the uniform charge placed on the photoconductive member at second charging station 22 to create a second toner image of a second color, for example, red.

The process may then be repeated using a third charging station 24 to lay down a uniform charge, a third electronic exposure station 34 to create a third electrostatic image and third development station 44 to create a third toner image of a different color, for example, blue.

At this stage in the process, a single frame or image area on the photoconductive member contains three distinct color images, i.e., a multicolor toner image. A fourth set of stations could create a fourth color in the same way.

The multicolor image is then transferred to a copy sheet at first transfer station 35. In the preferred embodiment shown in FIG. 1 the same process is repeated for the next frame resulting in another multicolor toner image. The copy sheet is inverted using a turnaround drum 4 and the second multicolor toner image is transferred to the side opposite that receiving the first multicolor toner image at second transfer station 36. The copy sheet is then fed without disturbing the toner images to a fuser 45 which fixes both images to the copy sheet simultaneously. The copy sheet is then fed to an output tray 46. This particular duplexing mechanism is well-known for monocolor reproduction, see for example, U.S. Pat. No. 4,191,465.

In the apparatus described in FIG. 1 three color images are produced at the same rate as monocolor images. Registration need only be accomplished between the exposing stations 30, 32 and 34. The sophistication of that registration depends on the requirements of the system. To obtain the most accurate registration, encoders 16, 17 and 18 are attached to rollers 10, 11a and 11b, which encoders assure the accuracy of placement of electronically controlled exposures by exposure stations 30, 32 and 34. For the greatest accuracy the rollers 10, 11a and 11b can also include sprockets which engage perforations in the member 2 to carefully control the location of the member during consecutive exposure. Each encoder would signal the angular location of its sprocket which in turn is positioned by a perforation engaging a tooth in the sprocket, which perforation is the same for comparable portions of all three images. However, if the tension of the web is different at these locations, stretching of the web to different extents ensues, thereby creating inaccuracies in registration to which the invention is addressed.

After the copy sheet has left the web to go to the fuser 45, the photoconductive member 2 is cleaned at cleaning station 50 for reuse, as is well-known in the art.

Obviously, if a two-color system alone is desired for a particular apparatus, the third charging station 24 exposure station 34 and toning station 44 can be eliminated. Two-color systems have particular application to high speed printers in which the primary mode of operation is monocolor, i.e., black, and the second color, usually red or blue, is used to highlight certain passages of text or give a flair to letterheads, logos, and the like. In such apparatus the first development station 40 or the second station 42 can be a larger, heavier duty development station than the other station. A two-color system which provides a mixture of the colors by placement of pixels of different color adjacent to each other in various combinations is disclosed in U.S. Pat. No. 4,903,048.

A problem faced by the method and apparatus described with regard to FIG. 1 and addressed in the aforesaid publication No. WO 90/01730 is that the second and third development stations have a tendency to disturb the previously applied toner, i.e., that applied by the first and second toning stations.

However, these problems can be solved by the use of a particular magnetic brush method and apparatus, disclosed in U.S. Pat. No. 4,546,060, Miskinis et al, issued Oct. 8, 1985; U.S. Pat. No. 4,473,029, Fritz et al, issued Sept. 25, 1984; and U.S. Pat. No. 4,531,832, Kroll et al, issued July 30, 1985. According to those patents, the developer is transported through the development zone by rotating an alternating-pole magnetic core within a non-magnetic shell upon which shell the developer flows through said zone, and the developer includes hard magnetic carrier particles that are sufficiently hard that they flip or tumble as they pass through the development zone. Further details regarding the developers and development stations are discussed in the aforesaid international publication.

Figure 2A:
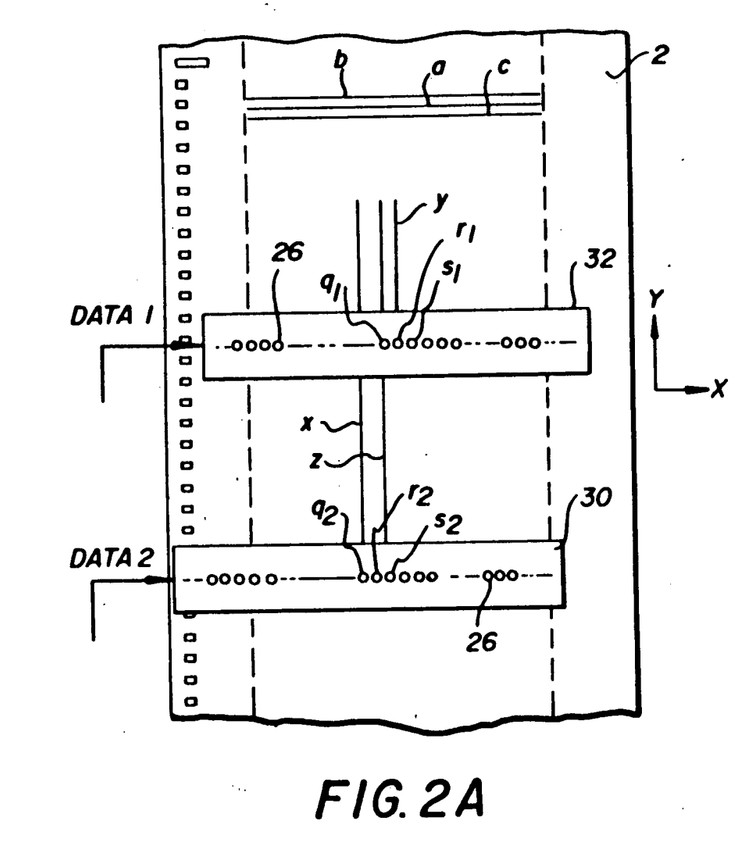
FIGS. 2A and 2B are schematics of a photoconductive web and two printheads recording thereon and illustrative of the problem of the prior art.

With reference now to FIG. 2A, a sketch is provided schematically illustrating the photoconductive web 2 and printheads 30 and 32 which are known LED printheads. As may be noted in this figure, the printheads are illustrated with one slightly offset from the other in the X-direction. The individual LED's 26 are shown greatly enlarged to facilitate this description, it being appreciated that thousands of these LED's are arranged in a row on each printhead which may have an overall length of about fourteen and one-half inches (14½"). For example, there may be 4352 LED's evenly spaced at 300 dots per inch. The printhead writer portion would print along about a fourteen inch center portion with an extra 72 LED's at each end. The light from the LED's may be focussed by a gradient index fiber lens such as a Selfoc lens, which is a trademark of Nippon Sheet Glass Company, Ltd. The degree of offset of the printhead is also shown exaggerated in size for purposes of this description and is due to the failure of the mechanical supports (not shown) to accurately align the two.

Figure 5:
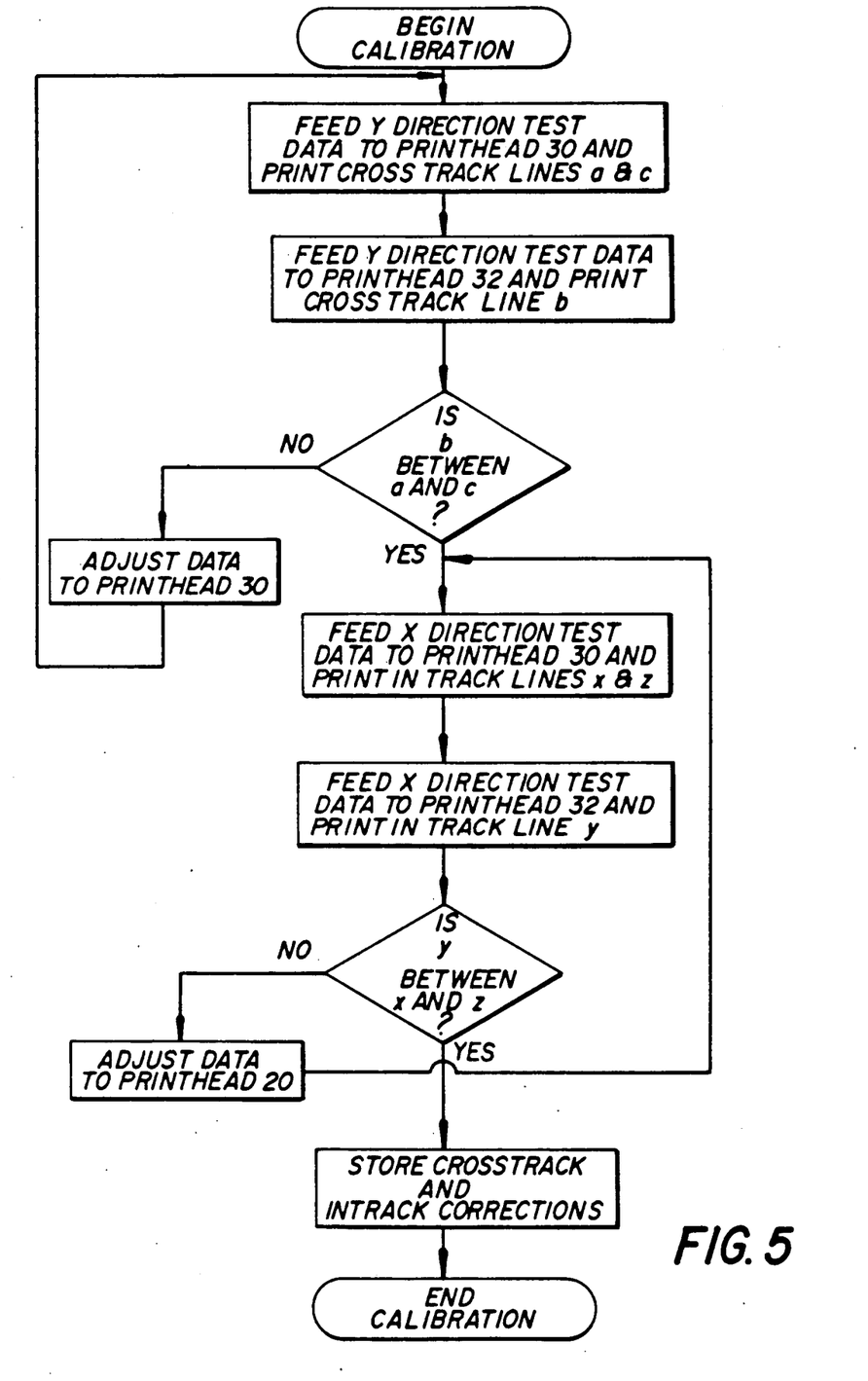
FIG. 5 is a flowchart illustrating the steps in a method in accordance with the invention.

In accordance with the invention and with further reference to the flowchart of FIG. 5, registration of the images produced by the respective printheads is accomplished by feeding "Y" direction test data to printhead #2 to "print" lines "a" and "c" (FIG. 2A). This is accomplished by sequentially feeding the lines of data signals to all the LED's in the printhead #30 so that two successive rows of pixels will be imaged on the photoconductive web and when developed by developer 40 will form a visible image of the cross-track lines illustrated as "a" and "c". One line of data pixels is then printed using the printhead #1 (32) and developed by developer 42 to form the line b. The timing for printing the line c may be provided in response to encoder perforations as described above. In this example, registration is proper where the line of pixels forming the line "b" is located between the lines of pixels forming the lines "a" and "c" (see FIG. 2B.). In this example FIG. 2A, line "b" is misregistered relative to the line "a" and "c". On subsequent lines of the image frame or a different image frame, in-line recordings of lines "x" and "z" are made using printhead 30 by providing many successive lines of data enabling signals to only two centrally located LED's, $q_2$, $s_2$, that straddle a particular LED $r_2$ on printhead 30. Successive lines of data enabling signals are also provided to LED $r_1$ on printhead 32 to print in-track line "y". LED $r_1$ corresponds in number to LED $r_2$ in that if both printheads are identical and counting LED's from the left side of each printhead, the two LED's $r_1$ and $r_2$ would have identical counts and would be at the respective centers of their printheads.

The LED's at the center are used for this test to try to reduce the accumulated X-position variation at the ends of the head. As may be noted in this example, the lines "x" and "z" do not straddle line "y" and there is thus misregistration of the printheads in the X-direction. These misregistrations may be seen by the operator upon transfer of the developed color images onto a single copy sheet as described above.

Figure 2B:
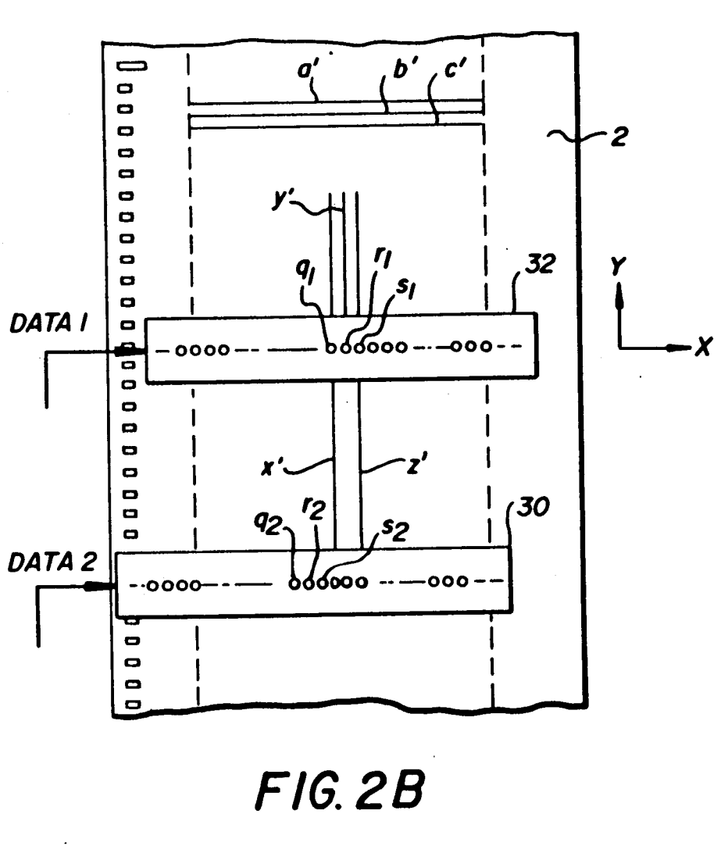

The invention is directed to the correction of these misregistrations (see FIG. 2B.)

Figure 3:
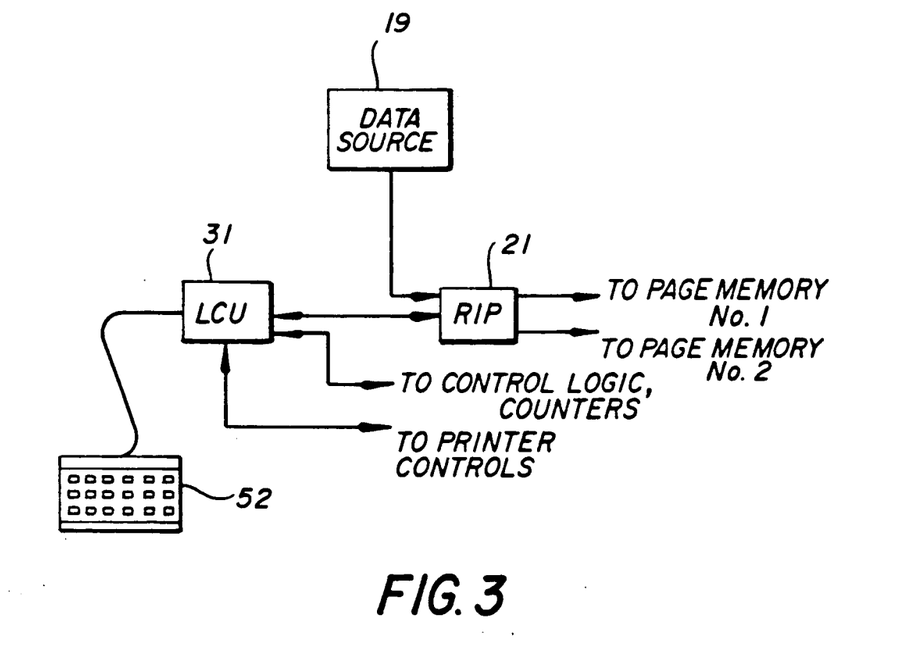
FIGS. 3 and 4 are a schematic of a circuit illustrating one embodiment of the invention.

With reference now to FIG. 3, a logic and control unit for the printer is illustrated generally at 31 and may comprise one or microcomputers programmed to perform the various functions described herein as well as those required for controlling a printer generally.

The LCU 31 controls the entire electrophotographic process based on the instantaneous location of the web in the travel path. The encoders associated with movement of the web 2 also produce timing signals for the LCU. The signals from the encoder cause the LCU to fine tune the process timing. The LCU 31 has a stored program responsive to the input signals for sequentially actuating, then de-actuating the work stations as well as for controlling the operation of many other machine functions.

Programming of a number of commercially available microcomputers is a conventional skill well understood in the art. This disclosure is written to enable a programmer having ordinary skill in the art to produce an appropriate control program for the microprocessor(s). The particular details of any such program would, of course, depend on the architecture of the designated microprocessor.

The LCU 31 consists of temporary data storage, a central processing unit, a timing and cycle control unit and a stored program control. Data input and output is performed sequentially under program control. Input data are applied either through input signal buffers to an input data processor or to an interrupt signal processor. The input signals are derived from various switches, sensors and analog-to-digital converters. The output data and control signals are applied to storage latches which provide inputs to suitable output drivers, directly coupled to leads. These leads are connected to the various work stations, mechanisms and controlled components associated with the apparatus.

As will be noted from FIG. 3, the LCU provides direct control of a raster image processor (RIP) 21 which in turn processes data generated by a data source which may comprise one or more word processors, computer output or image scanners. As is known, the processor processes the data so that a rasterized representation of the image to be printed by the printhead may be stored in respective page memories #1 and #2, FIG. 4, 66, 67. The data source 19 provides the RIP with information not only concerning the data to be printed but also the color to be used to print that particular piece of data.

Data for printing the test data as described with reference to FIG. 2A is provided from a stored set of test pixel data which may be stored in the LCU's stored program control. In order to correct for the errors of registration between the two printheads the operator using the keyboard 52 calls up a correction program using a key code and inputs correction factors via the keyboard. For example, and with reference to the cross-track lines printed in FIG. 2A, correction in timing of the printing of cross-track lines a, b and c may be provided by retarding the normal printhead printing cycle for printhead 32 a certain number of counts, say two (2) counts by entering into the keyboard the printhead identification, "#1," and "2" to indicate a retarding of timing by two counts. This information is input into the LCU 31 and an appropriate signal output to control logic 60 which controls the timing of read out of page memories 66, 67. In this example programmable counter 61 is set with a count related to the retarding of the printhead. In response to a signal provided by the LCU through control logic 60, the counter 61 commences to count clock pulses from clock 63 and sets a flip-flop 77 when the present retard count is reached. The setting of the flip flop 77 provides a pulse to a line address counter 64 which removes data from the page memory when page memory 66 is set by an "IN-OUT" signal from control logic 60 to read out data. The control logic also controls the reading out of data from page memory #2 for printing data on printhead #2. This data is read out in accordance with sync pulses provided by the encoders and input to the LCU. In this regard control logic 60 controls a programmable counter 62, a flip flop 76 and line address counter 65. By having the LCU load the retard factor $\Delta Y_1$ or $\Delta Y_2$ in the respective counters, the sync pulse from the encoder is appropriately used to delay the printing of the data for the respective printhead so that the registration may be adjusted for lines in the cross-track direction; see FIG. 2B wherein the lines "a", "b", and "c" are shown correctly adjusted. This adjustment by the operator may be through trial and error until appropriate registration is provided between the two printers as noted by examining copies of the test prints. The computer may have a stored program to print on one or more copy sheets various progressive adjustments by inputting say first a retard count of 1 for printhead #1, then a count of 2, then 3, etc. and by viewing the test prints determine the appropriate registration. A character set program in stored memory would provide character data for printing out words or letters indicating the test parameter used for each set of lines "a", "b", and "c" printed.

The ability to make small corrections in printing time for correcting misregistrations between printers may also be used to adjust the printing time of both printheads vis-a-vis the encoder sync pulses to thereby adjust position of the image upon the copy sheet. Normally, the perforations or other web indicia or counts derived therefrom are used to time the feeding of the copy sheet into image transfer relationship with the web 2. By providing a means to retard and/or advance the timing of the data to the printheads, improved control over registration may be realized. Such benefits also ensue even where only one printhead is provided in the printer.

Figure 4:
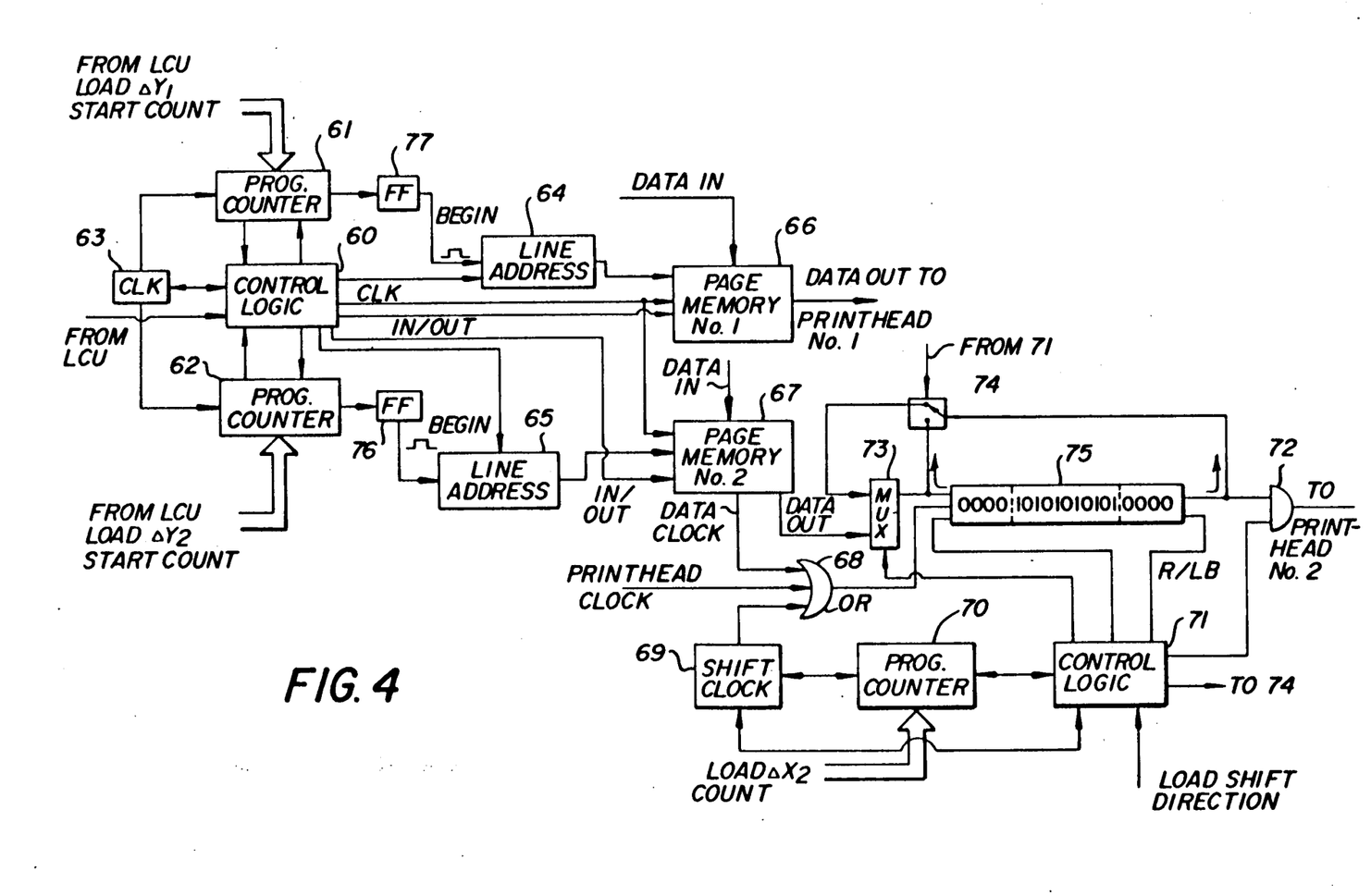

Description will now be provided relative to the correction for the misregistration of the in-track lines "x", "y" and "z". As noted above, this misregistration results from incorrect location of printhead 30 relative to printhead 32. An adjustment shift register 75 is provided for storing each line of data before being sent from page memory 67 to printhead 30. As illustrated in FIG. 4, a line of data for a printhead say of 14½" length has printable data of binary 1's and 0's stored sequentially and edge data of 0's at both ends that control say an extra 72 LED's at each end. The digital 0's of data preclude the respective LED from being illuminated assuming a Neg-Pos type of imaging system where toning of an image occurs where charge is removed in response to exposure. In order to for example shift the data for printhead 30 to the right in FIGS. 2 and 4, a code is called up on the keyboard 52 by the operator to program input of a request for right-left data shift of a specified count. For example, the operator might indicate via the keyboard that data for printhead #2 is to be shifted +3 or the data moved 3 LED counts to the right. A signal from the LCU is input to control logic 71 to indicate the direction of shift. The amount of the shift is loaded by the LCU into programmable counter 70. A multiplexer 73 controls the entry of data into shift register 75. This data can enter via page memory #2 or can be recirculated from the output of the register 75 back to the input. Recirculation of data is controlled by control logic 71 which provides a directional signal (R/LB) to the shift register 75 to indicate the right or left direction for shifting data in the bi-directional shift register 75. An enable signal from control logic 71 controls the time for enabling shifting that occurs in response to clock signals from page memory 2 that are synchronized with clock pulses formed by control logic 60 that is providing the clocking of the outputting of the data from page memory. These clock signals are communicated to shift register 75 via OR gate 68 that also couples the shift clock 69 which controls right to left direction shift timing. With a line of data now loaded in shift register 75, the control logic 71 controls a three-position switch 74 to allow data to be output from the right end of shift register 75 and replaced back into the left end through multiplexer 73. If the data is to be moved three places to the right, the programmable counter 70 is loaded with the count of 3 and the direction input to control logic 71. In response to the circulation of three data bits in register 75 to the right and back into the left end of the shift register, the data has effectively moved three places. It being understood that sufficient digital 0's are located at both ends of the register to not affect image data. Where the shift direction is to be to the left the switch 74 is signaled by control logic 71 to adjust so as to allow data to shift to the left out of the register and back into the right end. The R/LB line being biased to cause shifting in the left direction. With this adjustent of data now being made, the data can be shifted out of the register through AND gate 72 to the printhead in response to printhead clock pulses provided by the LCU and a gate signal from control logic 71 indicating that shifting of data to the printhead is the current mode of operation. The switch 74 is now open and prevents recirculation of data.

The data now being sent to the printhead may be subject to additional manipulation to format same for the type of printhead. Wherein each printhead includes effectively a single shift register for shifting the data bits, the data may be sent directly. However, faster shifting on the printhead may be realized by formatting the data in accordance with the technique disclosed in U.S. Pat. No. 4,882,686 to Gretter. Circuitry shown in Gretter may be used particularly where the driver chips for an LED are located on both sides of the linear array of LED's. Similar techniques disclosed by Gretter may be used to load shift register 75 more promptly. In addition, the shift register 75 may itself be the shift register on the printhead that stores the data bits for printing and the left-right adjustment of data as taught herein be made on the printhead. The patent to Gretter also discloses a circuit for driving LED's, the description of which is incorporated herein by this reference.

Still other modifications may be made including similar circuitry for left-right adjustment of data to printhead #1. Adjustment of the data may be made through software by the RIP itself thereby eliminating the need for much of the circuitry described with reference to FIG. 4.

While the invention has been described with reference to a preferred embodiment employing two light-emitting diode printheads, the invention may also be used to align three printheads in accordance with the teaching herein. Furthermore, other types of printers may be used such as laser printers, light valve printers, electrostatic recorders, ink jet, thermal recorders, etc. Correction can be done automatically using densitometers or electrometers to locate the lines and provide correction signals without the need for the operator to input correction values.

The invention has been described with reference to a photoconductor which is recorded upon and toned. The invention is also applicable to apparatus where the electrostatic image is transferred to a secondary member which is in turn toned and the image then transferred to a receiver sheet.

The invention has been described in detail with particular reference to preferred embodiments thereof, but it will be understood that variations and modifications can be effected within the spirit and scope of the invention.

What is claimed is:

1. A non-impact printer apparatus comprising:
a recording member for supporting an electrostatic charge;
a first printhead for producing a modulated charge pattern on the recording member in accordance with first image data signals provided thereto for creating in an area of the recording member a first electrostatic charge pattern representing an image to be reproduced with a first type of toner;
a first development means for developing the first electrostatic charge pattern on the recording member with toner of the first type;
a second printhead for producing a modulated charge pattern on the recording member in accordance with second image data signals provided thereto for creating in the said area of the recording member a second electrostatic charge pattern representing an image to be reproduced with a second type of toner;
a second development means for developing the second electrostatic charge pattern on the recording member with a toner of a second type;
means for simultaneously transferring the respective images to one surface of a copy sheet;
image data processing means for providing said image data signals to said first and second printheads;
said image data processing means including means for adjusting the image data signals representing information to be reproduced on the copy sheet and sent to one of the printheads to compensate for misregistration of the printheads.

2. The apparatus of claim 1 and including means for adjusting the timing of data signals to at least one of the printheads to compensate for misregistration of the printheads.

3. The apparatus of claim 2 and including means for adjusting the timing of data to both printheads to correct for registration on a copy sheet of the combined images recorded by the printheads;

and means for feeding a copy sheet into engagement with the member supporting the developed images for transferring the developed images to the copy sheet.

4. The apparatus of claim 3 and wherein the recording member is an electrophotographic member.

5. The apparatus of claim 4 and and wherein each printhead comprises a row of light-emitting diodes.

6. The apparatus of claim 1 and wherein the recording member is an electrophotographic member.

7. The apparatus of claim 6 and wherein each printhead means comprises a row of light-emitting diodes.

8. The apparatus of claim 1 and wherein said adjusting means adjusts the cross-track positioning of data recorded on the recording member.

9. The apparatus of claim 1 and wherein the first and second development stations develop the recording member with respective toners of different colors.

10. The apparatus of claim 1 and including means for storing test pixel data for generating a test pattern on the recording member.

11. The apparatus of claim 9 and including a raster image processor for rasterizing image data to be reproduced for transfer to the copy sheet.

12. The apparatus of claim 11 and including a page memory means for storing a page of data to be reproduced for transfer to the copy sheet.

13. The apparatus of claim 12 and including a recirculating line memory for storing a line of image data signals for recording a line of image data pixels and means responsive to an adjustment signal for circulating the data in said memory to adjust the position of said image data pixels on said recording member.

14. The apparatus of claim 13 and wherein the said one printhead receiving adjusted data signals includes a plurality of recording elements, one element for each signal stored in said line memory.

15. The apparatus of claim 13 and wherein the recording elements are light-emitting diodes.

16. The apparatus of claim 1 and including charging means for applying a charge to said area after development of said area by said first development means and prior to operation on said area by said second printhead for producing the second electrostatic charge pattern in said area.

17. The apparatus of claim 16 and wherein the printhead includes a plurality of light-emitting diodes and wherein said means for adjusting the image data signals shifts the image data signals so that signals to be recorded by one light-emitting diode are recorded by a different light-emitting diode.

18. A method for recording, said method comprising:

moving an electrophotographic recording member along a path;

electrostatically charging an area of the member;

illuminating a plurality of light-emitting diodes on a first printhead to electrostatically record in an area of the member a series of pixels representing an image to be recorded on the member representing image data signals to be recorded from a first printhead in a direction perpendicular to the path of movement of the member;

developing the image recorded on the member with a toner of a first color;

electrostatically charging the developed area of the member;

illuminating a plurality of light-emitting diodes from a second printhead to electrostatically record in the area of the member a second series of pixels representing a series of image data signals to be recorded on the member in a direction perpendicular to the path of movement of the member;

developing the image recorded in the second series of pixels with a toner of a second color;

simultaneously transferring the respective images to one surface of a copy sheet to form a composite recorded image;

generating a series of adjusted image data signals for recording a line of pixels by one of said printheads that are shifted in response to adjustment signals so that in response to the shifting of the image data signals the line of recorded pixels of one printhead is shifted relative to the line of recorded pixels of the other printhead to provide a more registered composite image.

19. The method of claim 18 and including the steps of generating a plurality of electrostatically recorded test lines recorded using both of the printheads, developing the test lines using differently colored toners, transferring the test lines to one surface of a copy sheet and inputting adjustment signals to adjust the control of which image data signals are to be recorded by respective light-emitting diodes on the said one of said printheads.

* * * * *